United States Patent [19]
Klein et al.

[11] Patent Number: 5,911,880
[45] Date of Patent: Jun. 15, 1999

[54] SELF-WETTING MEMBRANES FROM ENGINEERING PLASTICS

[75] Inventors: Elias Klein, Louisville, Ky.; Natarajan Balachander, Sunnyvale, Calif.

[73] Assignee: Research Corporation Technologies, Inc., Tucson, Ariz.

[21] Appl. No.: 08/573,085

[22] Filed: Dec. 15, 1995

[51] Int. Cl.$^6$ ................................................. B01D 39/00
[52] U.S. Cl. ............................... 210/500.41; 210/500.42; 210/493.1; 210/500.23; 264/41; 264/48
[58] Field of Search ............................. 210/490, 500.41, 210/500.23, 500.42, 493.1; 264/41, 48, 49

[56] References Cited

U.S. PATENT DOCUMENTS

| | | |
|---|---|---|
| 4,051,300 | 9/1977 | Klein et al. . |
| 4,812,269 | 3/1989 | Harttig et al. . |
| 4,900,449 | 2/1990 | Kraus et al. . |
| 4,961,852 | 10/1990 | Pemawansa et al. . |
| 5,071,448 | 12/1991 | Bikson et al. . |
| 5,071,973 | 12/1991 | Keller et al. ................................. 536/8 |
| 5,076,935 | 12/1991 | Kraus et al. . |
| 5,084,173 | 1/1992 | Nitadori et al. .................... 210/321.89 |
| 5,114,585 | 5/1992 | Kraus et al. . |
| 5,137,633 | 8/1992 | Wang . |
| 5,158,721 | 10/1992 | Allegrezza, Jr. et al. . |
| 5,178,765 | 1/1993 | Hu et al. . |
| 5,232,597 | 8/1993 | Eguchi . |
| 5,269,931 | 12/1993 | Hu et al. . |
| 5,277,812 | 1/1994 | Hu et al. . |
| 5,340,480 | 8/1994 | Kawata et al. . |

FOREIGN PATENT DOCUMENTS

| | | |
|---|---|---|
| 2175029 | 4/1996 | Canada . |
| 0 086 365 A1 | 8/1983 | European Pat. Off. . |
| 0 739 925 A1 | 10/1996 | European Pat. Off. . |
| 28 29 630A1 | 1/1979 | Germany . |
| 54-26283 | 2/1979 | Japan . |
| 62-201603 | 9/1987 | Japan . |

OTHER PUBLICATIONS

Patent Abstracts of Japan vol. 14, No. 417 (C–736) [4360], Sep. 10, 1990.
Patent Abstracts of Japan vol. 12, No. 56 (C–477) [2903], Feb. 19, 1988.
Aumen, et al. (Jul. 1987) "Alternating Block Copolymers of Aromatic Poly(ethe sulphone) and Poly(dimethylisiloxane) by Hydrosilylation", *Polymer 28*, 321–329.
Nyström, et al. (1990) "Resistant to Fouling Accomplished by Modification of Ultrafiltration Membranes", *Progress in Colloid & Polymer Science 82*, 321–329.
Immelman, et al. (1993) "Poly(vinylalcohol) Gel Sub–Layers for Reverse Osmosis Membranes. II. Insolubilization by Crosslinking with Poly(methylvinylether–alt–maleic Anhydride)", *Desalination 94*, 37–54.
Brink, et al. (1993) "The Anti–Fouling Action of Polymers Preadsorbed on Ultrafiltration and Microfiltration Membranes", *Journal of Membrane Science 76*, 281–291.

*Primary Examiner*—Ana Fortuna
*Attorney, Agent, or Firm*—Scully, Scott, Murphy & Presser

[57] ABSTRACT

A water wettable permselective membrane for use in hemodialysis, ultrafiltration and microfiltration applications and a device containing the same are provided. The membrane having the above properties comprises a hydrophobic-base polymer, such as a polysulfone or polyethersulfone polymer, and a block copolymer additive wherein one of the blocks of the copolymer additive is a hydrophilic polymer and the other block is a hydrophobic polymer that is analogous in structure to the hydrophobic-base polymer.

45 Claims, No Drawings

SELF-WETTING MEMBRANES FROM ENGINEERING PLASTICS

This patent research project was supported in part by a grant from the National Science Foundation, Grant No. EHR-9108764.

FIELD OF THE INVENTION

The instant invention relates to improved water wettable permselective membranes for use in hemodialysis, ultrafiltration and microfiltration applications. More specifically, the present invention relates to self-wetting membranes which comprise a hydrophobic-base polymer and an additive which comprises a block copolymer having one of the following structural formulas: AB or ABA wherein A is a hydrophilic polymer arid B is a hydrophobic polymer that is analogous in structure to the hydrophobic-base polymer. A device in the form of a filter or cartridge containing the membrane of the instant invention is also provided herein.

BACKGROUND OF THE INVENTION

The development of a hydrophilic water wettable membrane is necessitated by numerous filtration applications that use water, or water containing additives as the permeate. This includes filtration in the microfiltration (0.1–10 $\mu$m) and the ultrafiltration (0.001–0.01 $\mu$m) range.

Polysulfones (PS) and polyethersulfones (PES) are a class of hydrophobic polymers widely used today in the manufacture of flat sheet and hollow fiber membranes, which operate in the microfiltration range and the ultrafiltration range. Engineering plastics, such as polysulfones and polyethersulfones are widely used due to their easy processability and their ability to produce membranes having a wide range of pore structures. Moreover, they possess good thermal stability and good resistance to acid and alkali. However, both PS and PES are inherently hydrophobic polymers and their applications in microfiltration and to a larger extent in ultrafiltration is somewhat limited by the difficulties encountered in wetting such membranes.

The pressure required for one fluid to displace another fluid in the pores of a membrane ($\Delta$P) is related to the pore size and the interfacial tension of the contacting liquids by the relation, $$\Delta P = -2\gamma \cos \theta / r_p$$

where $r_p$ is the pore radius, $\gamma$ is the interfacial tension between the two fluids, and $\theta$ is the contact angle of the liquid on the membrane. The minimum pressure required to make the membrane permeable depends on the membrane material, the permeant liquids and the pore size of the membrane. If the fluid in the membrane pores is air, then the interfacial tension is that of the fluid/air interface. The inverse relationship between the pore radius and the applied pressure, coupled with the high contact angle of the liquid on the membrane makes the pressure required for water to wet hydrophobic membranes very high.

At the high pressures required to wet some ultrafiltration membranes, compression of the membranes may lead to an irreversible collapse of the pore structure and a loss of hydraulic permeability. Hydrophobic membranes like PS and PES are also prone to non-specific protein adsorption by virtue of their large hydrophobic surfaces. In pharmaceutical and therapeutic applications this may lead to rapid blockage of the pores' diameters and fouling of the membrane.

One obvious solution to the above problem with hydrophobic polymers is to use hydrophilic polymers as membrane forming materials. However, such hydrophilic polymers, like cellulose, are limited in their use due to their poor chemical resistance and lack of processability.

Several efforts have been made in the prior art to modify the hydrophobic properties of membranes made from engineering plastics. These have included chemical modifications of pre-formed membranes, and the use of hydrophilic polymers as additives in the membrane forming process. Examples of chemically modifying preformed membranes include, plasma treatment of the membranes to introduce hydrophilic groups on the surface, deposition of thin coatings of hydrophilic polymers on the surface of the hydrophobic membranes and the addition of hydrophilic polymers to the cast solution.

Additives used in membrane formation have covered a wide range of polymers. Water soluble polymers, such as polyethylene glycol (PEG) and polyvinyl pyrrolidone (PVP) have been used mainly in the prior art as pore formers in the manufacture of porous PS and PES membranes. Despite their success as pore formers, some portion of the foregoing additives remain in the membrane conferring a lower interfacial tension to the membrane. Examples of preparing hydrophilic membranes by using hydrophilic polymers in the casting solution as additives include the use of polyvinyl pyrrolidone as described in U.S. Pat. No. 4,051,300 to Klein et al., and the use of polyethylene glycols as described in Japanese Patent No. 54-26283, and in U.S. Pat. No. 4,900,449 to Kraus et al.

In both these methods, a small amount of the hydrophilic water soluble additive is retained in the membrane, and is susceptible to leach out on prolonged use in aqueous environments. In addition to the above problem of leaching, the Kraus et al. reference is useful only for polyethersulfone membranes and does not produce wettable membranes with polysulfone membranes. Other notable references using similar approaches (vis addition of PVP and/or PEG additives) include U.S. Pat. Nos. 5,232,597 to Eguchi and 5,340,480 to Kawata et al.

The use of coatings made from hydrophilic polymers, with or without subsequent crosslinking of the coating, is of limited applicability for ultrafiltration membranes, because the membranes pores shrink during the curing of the membranes (See; U.S. Pat. No. 5,277,812 to Hu et al.) Also the polymer, polyethylene imine (Corcat-600) is used as a membrane coating, producing a membrane which has ion exchange characteristics. Another example of a charge modified hydrophilic membrane, using an epichlorohydrin modified polyamine, is disclosed in U.S. Pat. No. 5,269,931 to Hu et al. While such crosslinked coatings may be stable to water extractions, they modify the pore sizes of the membranes. In the case of very small pores, such as needed for ultrafiltration applications, they lead to a wide range of pore sizes which can be difficult to control during manufacturing.

Other approaches of producing a membrane having a wettable surface include the use of additives that are not necessarily water soluble. An example of such an approach is disclosed in U.S. Pat. No. 5,178,765 to Hu et al. Specifically, this reference discloses a blended polyethersulfone membrane which contains a poly(2-alkyl or aryl) 2-oxazoline resin and an excess of PVP.

A permanently charged membrane containing a guarternized nitrogen containing polymer is described in U.S. Pat. No. 5,114,585 to Kraus et al.

U.S. Pat. No. 5,076,935 to Kraus et al. describes a membrane which contains a blend of polyethersulfone/phenoxy resin.

U.S. Pat. No. 4,961,852 to Pemawansa et al. describes a coating of a polyaldehyde polymer on PES. The polyaldehyde coating introduces hydrophilicity to the PES polymer, but it contains reactive aldehyde groups and is not useful for filtration involving reactive functional groups.

U.S. Pat. No. 5,158,721 to Allegrezza, Jr. et al. describes a membrane comprising a membrane forming hydrophobic polymer and a hydrophilic monomer; which is cast, cured and coagulated before drying. U.S. Pat. No. 5,137,633 to Wang also describes the use of crosslinked polyamine epichlorohydrin resin, and a monomer precursor crosslinked by radical polymerization, to obtain a charged resin.

Introduction of sulfonic acid groups in pre- or post-formation of the membranes has been employed in the prior art to improve water wettability of PS and PES membranes (See; for example, U.S. Pat. No. 3,885,122 to Bourgnel and German Patent No. 2,829,630). Despite their success in providing water wettability to PS and PES polymers, introduction of ionic sulfonic acid groups has the distinct disadvantage of the membrane exhibiting ion-exchange properties.

U.S. Pat. No. 5,071,448 to Bikson et al. deals with the use of sulfonated polysulfones to form semipermeable membranes.

The aforementioned techniques are generally only useful for microporous membranes. However, when applied to ultrafiltration membranes, these coatings do not penetrate the pores to make them wettable, but instead form coatings essentially blocking the smallest and most numerous pores. Other prior art approaches to modifying these membranes also suffer from the drawbacks discussed above.

In view of the numerous drawbacks mentioned hereinabove, it would be highly advantageous, to develop a permselective membrane which can be used in hemodialysis, ultrafiltration and microfiltration applications that has a high degree of wettability.

SUMMARY OF THE INVENTION

The present invention is directed to a water wettable permselective membrane which is useful in hemodialysis, ultrafiltration and microfiltration applications. More specifically, the present invention relates to a self-wetting membrane comprising a hydrophobic-base polymer and an additive. The additive employed in the instant invention comprises a block copolymer having one of the following structural formulas: AB or ABA wherein A is a hydrophilic polymer and B is a hydrophobic polymer that is analogous in structure to the hydrophobic-base polymer.

In accordance with the present invention, the hydrophobic-base polymer and the "B" segment of the block copolymer are hydrophobic polymers, such as polysulfone (PS) or polyethersulfone (PES). The "A" segment of the block copolymer is an aliphatic polyether polymer such as polyethylene glycol, polypropylene glycol or their derivatives which introduce additional reactive end groups to the block copolymer. The specific end groups that may be introduced to the block copolymer of the instant invention include, but are not limited to, hydroxy, mesylate, tosylate, —$NH_2$, —COH, halides, —$COOR^2$ wherein $R^2$ is an alkyl group or hydrogen, —COX wherein X is a halogen such as Cl or Br, epoxide, or vinylic end groups.

Unlike prior art additives such as polyvinyl pyrrolidone (PVP) or polyethylene glycol (PEG) that are added to the hydrophobic-base polymer as pore formers, the block copolymer additives of the instant invention have structural units which cause the hydrophobic-base polymer to retain the additive in the presence of an extracting solution. The additives of the present invention therefore impart sufficient surface hydrophilic character to the hydrophobic-base polymer at fairly low concentrations to provide lower interfacial tension between the resulting membrane and water. Thus, the block copolymer additives of the present invention improve the wettability of hydrophobic-base polymers such as PS or PES that are typically utilized in forming membranes for hemodialysis, ultrafiltration and microfiltration applications.

In another aspect of the present invention, a device, such as a filter or cartridge, containing the above described membrane is also disclosed. Specifically, in this aspect of the present invention, the membrane comprising the hydrophobic-base polymer and additive is formed into a filter or contained within a cartridge and is utilized in hemodialysis, ultrafiltration and microfiltration applications.

DETAILED DESCRIPTION OF THE INVENTION

As stated hereinabove, the present invention relates to self-wetting membranes that are useful in hemodialysis, mircofiltration or ultrafiltration applications. Specifically, the membranes of the instant invention which exhibit higher wettability as compared to prior art membranes comprise a hydrophobic-base polymer and a block copolymer additive as described hereinbelow.

The hydrophobic-base polymers that are employed in the instant invention are engineering plastics such as polysulfone (PS) or polyethersulfone (PES) polymers. These polymers are used in the instant invention because of their easy processability and their ability to produce membranes that have a wide range of pore structures and sizes. It should be understood that other structural polymers having terminal functional groups which can be activated for subsequent chain extension with a hydrophilic polymer segment may also be employed in the instant invention as the hydrophobic-base polymer. Other hydrophobic-base polymers that may be employed in the instant invention include, but are not limited to, polyetherketones and polyamides.

As stated above PS and PES are the preferred hydrophobic-base polymers employed in the instant invention. The PS polymers which are employed in the instant invention as the hydrophobic-base polymer have the structural formula:

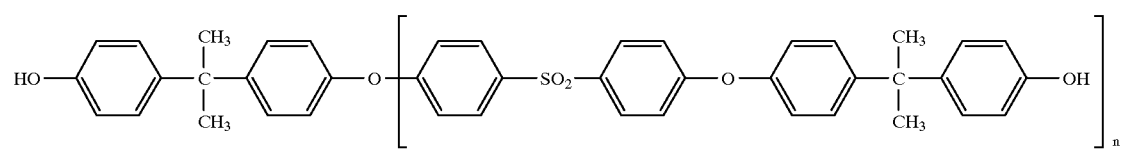

wherein n is an integer from about 30 to about 225. Highly preferred PS polymers employed in the instant invention are those wherein n is from about 45 to about 130.

The foregoing PS polymers can be made using conventional techniques that are well known to those skilled in the art or they are commercially available polymers. A highly preferred PS polymer employed in the instant invention is sold by Amoco Chemical Co. under the tradename UDEL-1700.

The PES polymers employed in the instant invention as the hydrophobic-base polymers have the structural formula:

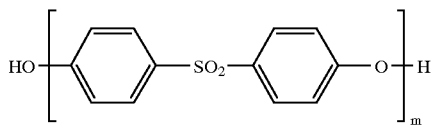

wherein m is an integer from about 50 to about 175. In a highly preferred embodiment of the instant invention, m is from about 60 to about 100.

As in the case with the PS polymers, the PES polymers that are employed in the instant invention as the hydrophobic-base polymer are made using conventional techniques that are well known to those skilled in the art or they are commercially available. In another highly preferred embodiment of the instant invention, the PES polymer is a commercially available polymer which is manufactured by BASF Corporation and sold under the tradename Ultrason E-6020P.

In accordance with the present invention, improved wettability of the hydrophobic-base polymer is obtained by incorporating a block copolymer additive into the base polymer. Specifically, the additive of the instant invention is a block copolymer having one of the following formulas:

AB, or

ABA wherein the "A" segment of the block copolymer is a hydrophilic polymer and the "B" segment of the block copolymer is a hydrophobic polymer that is analogous in structure to the hydrophobic-base polymer. By analogous in structure to the base polymer, it is meant that the "B" segment of the block copolymer additive contains the same basic repeating units as the hydrophobic-base polymer.

The hydrophilic segment of the block copolymer additive, A, of the instant invention is an aliphatic polyether polymer or a derivative thereof having one of the following formulas:

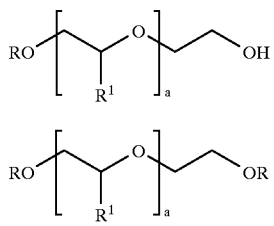

wherein R is hydrogen or lower alkyl, $R^1$ is hydrogen or lower alkyl; and a is an integer from about 10 to about 150.

In addition to the end groups of the polyether polymer depicted above, the end groups of the polyether polymer derivatives may consist of mesylate, tosylate, —$NH_2$, —CHO, halides, $COOR^2$ wherein $R^2$ is hydrogen or lower alkyl, —COX wherein X is halogen, epoxide, or they may contain vinylic end groups that can be linked with appropriate end groups on the "A" segment of the block copolymer. In addition, one of the end groups of ethylene glycol derivative can be protected in the form of an ether of the form PEO—O—$R^3$ wherein PEO is polyethylene glycol and $R^3$ is a lower alkyl group.

The term "lower alkyl" as used herein denotes any straight chain or branched alkyl which contains from about 1 to about 8, preferably from about 1 to about 4, carbon atoms. Illustrative examples of lower alkyls that may be contained within the aliphatic polyether polymer include, but are not limited to, methyl, ethyl, propyl, isopropyl, butyl, isobutyl, t-butyl, amyl, pentyl, hexyl, octyl and the like.

The preferred aliphatic polyether polymers that are employed in the instant invention are those wherein R is hydrogen or lower alkyl, $R^1$ is hydrogen or methyl and a is from about 15 to about 150. The most preferred aliphatic polyethers employed in the present invention are those wherein R is hydrogen or methyl, $R^1$ is hydrogen or methyl and a is from about 15 to about 150; i.e., polyethylene glycol (PEG) or polypropylene glycol (PPG).

The aliphatic polyether polymers employed as the hydrophilic polymer segment of the block copolymer additive are commercially available or they can be prepared using conventional processes that are well known to those skilled in the art. For example, polyethylene glycol derivatives can be synthesized using the procedure described in Journal of Polymer Science:Polymer Chemistry Edition, 1984,22, pp. 3341–3352 and Macromolecules, 1990, 23, pp. 3742–3746.

The aliphatic polyether polymers employed in the instant invention typically have an average molecular weight which ranges from about 300 to about 5,000 grams per mole. More preferably, the average molecular weights of the aliphatic polyether polymers range from about 600 to about 3,000 grams per mole.

As stated hereinabove, the "B" segment of the block copolymer additive is a hydrophobic polymer that has the same basic repeating unit as the hydrophobic-base polymer. Thus, the "B" segment of the block copolymer is a polymer which contains the same repeating polymer units as PS or PES.

More specifically, "B" may be a polysulfone polymer which has repeating units of the formula:

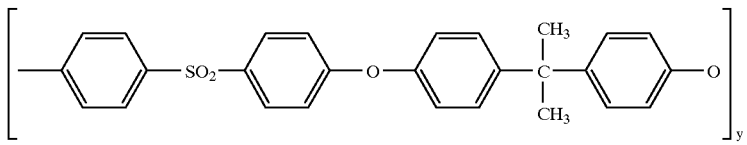

wherein y is an integer from about 6 to about 100, preferably, y is from about 10 to about 20.

In accordance with another embodiment of the present invention, "B" of the block copolymer additive may also be a PES polymer which has repeating units of the formula:

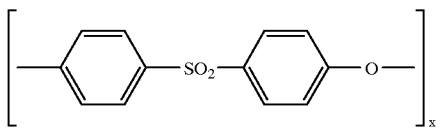

wherein x is an integer from about 12 to about 200, preferably x is an integer from about 12 to about 40.

It should be understood that the foregoing formulas describe the basic repeating units for the hydrophobic segments of the block copolymer additive. In both cases, the polymers may be terminated with various end groups which may be the same or different and include, but are not limited to —OH, —NH$_2$, Cl, F, Br, NCO or vinyl. It is however highly preferred that the polymer be terminated at each with the same end group, with —OH end groups being most preferred.

It should be also emphasized that oligomers of the aforementioned polymers may also be used as the "B" segment of the block copolymer additive. The term "oligomer" is used herein to denote a polymer that is made up of two or more of the above PS or PES monomer units.

The polymers used in forming the hydrophobic segment of the block copolymer additive are either commercially available or they can be synthesized using processes that are well known to those skilled in the art. For example, hydroxy terminated polysulfone polymers may be prepared from the techniques set forth in Polymer, 1984, 25, pp. 1827–1836; Polymer Science and Engineering, 1977, 17, pp. 647–651 or Polymer Preprints, 1982, 23, pg. 284.

Typically, in the present invention, the molecular weight of the hydrophobic segment of the block copolymer is from about 2,000 to about 50,000 grams/mole. More preferably, the molecular weight of the hydrophobic block is from about 3,000 to about 40,000 grams/mole.

The block copolymer additive employed in the instant invention may be prepared using conventional techniques that are well known in the art. For example, the hydrophilic segment, "A", may be coupled to the hydrophobic segment, "B", by a nucleophilic displacement reaction, a nucleophilic substitution, or a coupling reaction using coupling agents such as COCl$_2$, CDI, carbonate, carbamate and the like.

The molecular weight range of the block copolymer additive employed in the instant invention is typically in the range of from about 5,000 to about 25,000 grams/mole. More preferably, the block copolymer additive employed in the instant invention has a molecular weight which ranges from about 10,000 to about 20,000 grams/mole. It should be understood that higher molecular weight block copolymers may also be employed in the instant invention depending upon the ratio of the blocks that constitute the AB and ABA type copolymers.

The self-wetting membranes of the instant invention which are useful in hemodialysis, ultrafiltration and microfiltration applications are prepared from a solution which comprises (a) a hydrophobic-base polymer, as described hereinabove, (b) a block copolymer, as described hereinabove, and (c) a solvent which is capable of dissolving component (a) and component (b). A non-solvent quenching bath is employed in the instant invention to precipitate the final polymer product from the above solution.

Typically, in the present invention, the block copolymer additive is added in an amount, based on the total polymer mass in the solution, of from about 3 to about 20 wt. %. More preferably, from about 4 to about 15 wt. % of the block copolymer additive is employed in the instant invention.

Suitable solvents that may be employed in the instant invention are polar solvents such as dimethylformamide (DMF), dimethylsulfoxide (DMSO), dimethylacetamide (DMA), N-methylpyrrolidone (NMP) and the like. Mixtures of one or more of the aforementioned polar solvents are also contemplated herein. In addition to the use of polar solvents, the solvent employed in the instant invention may consist of a mixture of one of the aforementioned polar solvents and a non-solvent such as water or an alcohol.

Typical quenching baths that are utilized in the present invention in the formation of the self-wetting membrane include, but are not limited to, baths which contain non-solvents such as water, alcohols and the like. Non-solvent mixtures containing a combination of the forestated polar solvents and non-solvents are also contemplated herein. The mixture of the non-solvent and polar solvent is selected in accordance with the principals described in Klein et al., "The Use of Solubility Parameters for Solvent Selection in Asymmetric Membrane Formation", Pages 61–84 in the book entitled Reverse Osmosis Research, edited by H. K. Lonsdale and H. E. Podall, Plenum Publishing Corporation, 227 West 17th Street, New York, N.Y. 10011. In a highly preferred embodiment of the instant invention the quenching bath is a bath which contains water as the non-solvent.

Components (a)–(c) are first mixed together and then heated at a temperature of about 55 to about 75° C., preferably about 60 to about 65° C., until a homogeneous solution is obtained.

Flat sheet membranes are then prepared on a suitable substrate such as glass by casting a film having a thickness of about 0.005 to about 0.006" using a doctoring knife.

After casting the film, the film is coagulated in a quenching bath containing a suitable solvent such as described hereinabove and then it is washed in water for a period of time which is sufficient to leach out any material that is not directly bound to the hydrophobic-base polymer. The membrane is then dried by methods well known to those skilled in the art.

In addition to preparing flat sheet membranes, the self-wetting membranes of the instant invention can be formed into pleated membranes, hollow fiber membranes, tubular membranes and the like using processes that are well known in the art.

In a highly preferred embodiment of the instant invention, the self-wetting membranes are formed into hollow fiber membranes using co-extrusion processes that are also well known in the art. One example of preparing hollow fiber membranes by co-extrusion is described in U.S. Pat. No. 4,051,300 to Klein et al., the contents of which are incorporated herein by reference.

As stated hereinabove, the membranes of the instant invention which contain a hydrophobic-base polymer and a block copolymer additive exhibit a higher degree of water wettability than membranes known heretofore. The term "wettability" as used herein denotes the ability of water to wet the membrane, including the surfaces of the pore structure. The degree of wettability is quantified in the instant invention as the membranes' functional wettability. The term "functional wettability" is defined herein as the percent ratio of the hydraulic permeability (using water) of a dried membrane to the maximum hydraulic permeability observed after wetting the membrane with a wetting agent of lower surface tension that spontaneously wets the membrane. It should be understood that a membrane is spontaneously wettable in the present invention if the functional wettability is greater than 60%.

In accordance with another aspect of the present invention, a device for use in hemodialysis, microfiltration and ultrafiltration applications is provided. In accordance with this aspect of the present invention, the device contains, as one of its components, the self-wetting membrane of the instant invention. Specifically, the device of the present invention comprises a filter which contains the self-wetting membrane of the instant invention therein. More specifically, the filter of the present invention comprises a disposable or non-disposable cartridge which contains the self-wetting membrane of the present invention.

The cartridge employed in the instant invention could be in the form of a pleated cylinder, flat disc or hollow disc depending on the specific use of the device of the instant invention.

The foregoing examples are given to illustrate the scope of the invention. Because these examples are given for illustration purposes only, the invention embodied therein should not be limited thereto.

EXAMPLE 1

Preparation of a Hydroxy Terminated Polysulfone Oligomer

In this example, a hydroxy terminated polysulfone oligomer was synthesized as follows:

Sixty,(60) grams of 4,4' dichlorodiphenyl sulfone and 57.3 grams of Bisphenol-A were heated with 250 ml N-methyl pyrrolidone (NMP), 100 ml toluene and 37.3 grams of potassium carbonate at about 120° C. for 4 hrs. The toluene and the water which was formed in-situ was then azeotroped off at 110–120° C. for about 4 hrs. After the complete distillation of the toluene and water, the temperature of the reaction was raised to about 185–190° C. for about 6 hrs. The reaction mixture was then cooled to room temperature, acidified with acetic acid and the final product was obtained by precipitating the polymer into a vigorously stirred solution of methanol and water. This oligomer may be used as the B segment of the block copolymer of the instant invention. p-Hydroquinone can also be used as a comonomer to give oligomers with —OH terminal groups.

EXAMPLE 2

Synthesis of an Amine Terminated Polysulfone Oligomer using 4-Aminophenol as the Comonomer An amine terminated polysulfone oligomer was prepared as follows:

Forty (40) grams of 4,4' dichorodiphenyl sulfone, 31.7 grams of Bisphenol-A and 9.1 grams of 4-aminophenol were heated with 200 ml dimethyl sulfoxide (DMSO), 100 ml toluene and a solution of 15.2 grams of NaOH in 20 ml water at reflux for 3 hrs. After all the toluene and water was distilled off, the temperature was raised to about 170–175° C., and heated for an additional 3 hrs. The reaction mixture was cooled to about 90° C., and the polymer was precipitated into a methanol/water mixture.

EXAMPLE 3

Synthesis of a Hydroxy Terminated Polyethersulfone (PES) Oligomer

This example describes the synthesis of a hydroxy terminated polyethersulfone oligomer. 4,4' dichlorodiphenyl sulfone (90 g), and Bisphenol-S (94.2 g) were heated with 300 ml NMP, 200 ml toluene and 60 grams of anhydrous potassium carbonate at about 130–140° C. for about 4 hrs. The toluene and the water was then distilled off and thereafter the temperature of the mixture was raised to about 190° C. and maintained for 5 hrs. The reaction mixture was cooled, acidified with acetic acid and precipitated into vigorously stirred solution of 50/50 (v/v) methanol/water.

EXAMPLE 4

Synthesis of a Mesylate Derivative of Polyethylene Glycol

This example describes the preparation of a mesylate of polyethylene glycol. Polyethylene glycol methyl ether (300 g, mol. wt. 2,000 g/moles), triethylamine (20.3 g) were dissolved in 400 ml of methylene chloride and cooled to about 0° C. in an ice bath. A solution of methanesulfonyl chloride (30 g) in 100 ml methylene chloride was slowly added and the mixture was stirred at about 0° C. for 3 hrs. The precipitated triethylamine hydrochloride was filtered off and the product was concentrated and precipitated into rapidly stirred ether at a temperature of from about −5 to about 0° C.

EXAMPLE 5

Preparation of ABA Block Copolymer of Polyethylene Glycol—(PEG) and Polysulfone (PS)

This example describes the procedure for preparing a PEG-PS-PEG block copolymer which is used in the instant invention as an additive to a hydrophobic-base polymer. Specifically, the block copolymer was prepared using the following procedure:

Twenty-five (25) grams of the polysulfone polymer prepared in Example 1 and 23 grams of potassium carbonate were heated with 100 ml NMP and 100 ml toluene at about 110–120° C. for about 4 hrs. The water and toluene was then distilled and cooled to about 60–70° C.

A solution of the mesylate of PEG prepared in Example 4 (55 g) in 100 ml NMP was added and the mixture was thereafter heated at 90° C. for an additional period of 4 hrs. The mixture was then cooled, acidified and precipitated in ice cold ether.

EXAMPLE 6

Preparation of ABA Block Copolymer of Polyethylene Glycol (PEG) and Polyethersulfone (PES)

This example describes the procedure employed in the instant invention for preparing a PEG-PES-PEG block copolymer which is used in the instant invention as an additive to improve the wettability of a hydrophobic base polymer. Specifically, the PEG-PS-PEG block copolymer was prepared as follows:

100 grams of the polyethersulfone polymer prepared in Example 3 and 40 grams of potassium carbonate were heated with 300 ml NMP and 200 ml toluene at a temperature of about 110–120° C. for about 4 hrs. The water and toluene was then distilled off and the mixture was cooled to about 90° C.

A solution of the mesylate of polyethylene glycol produced in Example 4 (210 g) in 250 ml NMP was added and the mixture was then heated at 90° C. for an additional 4 hrs. The mixture was cooled, acidified and block copolymer was precipitated in ice cold ether.

EXAMPLE 7

Synthesis of Dimesylate Derivative of Polyethylene Glycol

In this example a dimesylate derivative of PEG was prepared. Specifically, 30 grams of PEG (MW-2000) and 6.1 grams of triethylamine were dissolved in 100 ml methylene chloride and cooled to about 0° C. in an ice bath.

A solution of methanesulfonyl chloride (12.6 g) in 75 ml methylene chloride was slowly added at about 0° C. for about 3 hrs. The precipitated triethylamine hydrochloride was filtered off and the product was concentrated and precipitated in rapidly stirred ether at a temperature of from about −5 to about 0° C.

EXAMPLE 8

Synthesis of AB Block Copolymer of Polysulfone Oligomer and Polyethylene Glycol

In this example a block copolymer comprising a polysulfone oligomer and polyethylene glycol was prepared as follows:

Six (6.0) grams of the polysulfone oligomer of Example 1 and 5.0 grams of potassium carbonate were mixed with 74 ml NMP and 100 ml toluene and heated at reflux for about 4 hrs. The toluene and water released was distilled off and the reaction was cooled to about 90° C.

Next, a solution of polyethyl glycol ($\alpha,\omega$-dimesylate) (8 g) in 20 ml NMP was added and heated at 160° C. for about 3 hrs. The reaction mixture was cooled to room temperature, acidified and the block copolymer was precipitated in ice cold ether.

EXAMPLE 9

Preparation of Various Membranes

In this example, a membrane in accordance with the present invention was prepared and its wettability and permeability were determined and compared to that of two prior art membranes.

Specifically, a water wettable membrane of the instant invention comprising a PES hydrophobic-base polymer and a PEG-PES-PEG block copolymer was prepared by first mixing 6.75 grams PES (Ultrason E-6020P), 2.25 grams of the PEG-PES-PEG block copolymer prepared in Example 5 and 3.0 grams PEG with 36.75 grams of DMSO and 1.25 grams of water. The PEG employed in this example does not function as an additive. Rather, it serves as a pore former which leaches out during the final washing.

The above mixture was then heated in an oven at 65° C., and a homogeneous solution was obtained, Flat sheet membranes were prepared on glass by casting a 0.005"–0.006" thickness film using a doctoring knife. During the casting step, the polymer begins to become cloudy and is coagulated within 30 seconds in a bath containing 80% DMSO/20% water (v/v) for 15 minutes, and then washed in a water bath for 2 hrs. Half the sample was dried in air overnight, and the other half dipped in a solution of glycerol, water, isopropanol (5,65,30 (v/v)) for 1 hr before being air dried overnight.

Two control samples were prepared using the same procedure as described above with the following compositions.

Controlled Experiment 1 (CE1): Mix together 7.5 grams PES (Ultrason E-6020P), 1.25 grams water, 3.0 grams PEG and 38 grams of DMSO.

Controlled Experiment 2 (CE2): Mix together 7.5 grams PES (Ultrason E-6020P), 1.25 grams of water and 38 grams DMSO.

Determination of Wettability and Permeability

The wettability and permeability of the above prepared membranes were determined using the following procedure.

The dried membranes were cut out into discs of about 4.42 cm. diameter, and the hydraulic permeability of water of each membrane was measured using an Amicon filtration apparatus. The membranes are then wetted, first with 50/50 (v/v) mixture of ethanol, followed by ethanol. Then the water permeability of the membrane was measured.

The hydraulic permeabilities ($L_p$) are expressed in units of mL/h/m$^2$/mm of Hg. The ratio of the hydraulic permeability of the dried membrane to that of the fully wetted membrane is expressed as the functional wettability. In an alternative experiment the wettability and permeability of the above membranes were determined by dipping the membranes in 5% glycerine solution for 1 hr and then air drying.

The results of these studies are tabulated in Tables I and II. Specifically, the data in Table I illustrates that membranes of the instant invention which employ a block copolymer of PEG/PES/PEG as the additive have a significantly higher permeability and wettability as compared to prior art membranes that use only PEG as an additive (CE1), or to membranes which do not contain any additives (CE2).

In Table II, the results also show that the introduction of the additive of the instant invention into PES membrane provides significantly higher permeability and wettability then either the membrane containing a PEG additive (CE1) or the membrane containing no additive (CE2).

EXAMPLE 10

Preparation of PS Based Water Wettable Membrane Containing a PEG-PS-PEG Copolymer This example describes the preparation of a PS based water wettable membrane incorporating a PEG-PS-PEG copolymer. Specifically, the membrane was prepared as follows:

A stock solution was prepared by blending a cold mixture of 37.5 grams of PEG, 62.5 grams of N-methyl pyrrolidone and 3 grams of water with polysulfone (UDEL-1700). The mixture was then heated at 65° C. in a closed bottle to obtain a clear homogeneous solution. The polymer was completely dissolved at this temperature within about 15 minutes.

Another stock solution containing 2.6 grams of PEG-PS-PG block copolymer of Example 5, 3.9 grams of PEG, 0.3 grams of water and 65 grams of NMP was also prepared and throughly mixed prior to use.

Membranes were then prepared by mixing various ratios of the two stock solutions together, as indicated in Table III, a 0.007" thick film was cast on glass and allowed to air dry for about 2–3 minutes. The membrane was then transferred to a water bath and washed for 2 hrs.

The permeability and wettability of the membranes were then determined following the procedure described in Example 9 and the results thereof are tabulated in Table III.

The data shown in Table III demonstrates that the functional wettability of the polysulfone membranes decrease with decreasing amounts of the PEG-PS-PEG additive relative to the bulk polysulfone content. At additive contents of as low as 5% in the membrane, the functional wettability of the membrane is 60% and the dried membrane rewets spontaneously, and approaches hydraulic permeability of the membrane that was completely wet with a liquid of low surface tension (ethanol) prior to the measurements.

TABLE I

Functional Wettability of PES Membranes

| Additive | Permeability $L_p$ (ml/h/m²/mm Hg) | | Functional Wettability (%) |
|---|---|---|---|
| — | Dry[a] | Wet[b] | — |
| PEG/PES/PEG | 56.25 | 67.71 | 83 |
|  | 14.03 | 14.49 | 97 |
| PEG (CE1) | 1.64 | 161.4 | 1.0 |
|  | 7.97 | 188.8 | 4.2 |
| None (CE2) | 0.0 | 110.9 | 0 |
|  | 9.0 | 215.6 | 4.1 |

[a]Permeability before membrane is wetted
[b]Permeability after membrane is wetted with ethanol.

TABLE II

Functional Wettability of PES Membranes

| Additive | Permeability $L_p$ (ml/h/m²/mm Hg) | | Functional Wettability |
|---|---|---|---|
| — | Dry[a] | Wet[b] | — |
| PEG/PES/PEG | 813 | 923 | 87 |
|  | 946 | 1029 | 92 |

TABLE II-continued

Functional Wettability of PES Membranes

| Additive | Permeability $L_p$ (ml/h/m²/mm Hg) | | Functional Wettability |
|---|---|---|---|
| — | Dry[a] | Wet[b] | — |
| PEG (CE1) | 137 | 169 | 81 |
|  | 73 | 102 | 72 |
| None (CE2) | 112 | 212 | 53 |
|  | 174 | 194 | 90 |

[a]Permeability before wetting.
[b]Permeability after dipping in 5% glycerine Solution.

TABLE III

Functionally Wettability of PS Membranes Containing varying Percentages of PEG-PS-PEG Additive

| % Additive | $L_p$ (Dry) ml/h/m²/mm Hg | $L_p$ (Wet) ml/h/m²/mm Hg | Functional Wettability (%) |
|---|---|---|---|
| 10 | 60.9 | 65.0 | 94 |
| 5 | 31.1 | 46.5 | 67 |
| 5 | 32.1 | 50.1 | 63 |
| 2.5 | 2.6 | 34.1 | 7.6 |
| 0 | 1.1 | 23.0 | 4.8 |

The above embodiments and examples are given to illustrate the scope and spirit of the present invention. These embodiments and examples will make apparent, to those skilled in the art, other embodiments and examples. These other embodiments and examples are within the contemplation of the present invention; therefore, the instant invention should be limited only by the appended claims.

What is claimed is:

1. A self-wetting membrane comprising a blend of a hydrophobic-base polymer and an additive, said additive being present in an amount of at least about 3 wt. % so as to achieve improved wettability of said hydrophobic-base polymer, said wt. % being based on total polymer mass of said membrane, wherein said additive is incorporated into said hydrophobic-base polymer and comprises a block copolymer having one of the following formulas:

AB or ABA wherein A is a hydrophilic polymer and B is a hydrophobic polymer that is analogous in structure to said hydrophobic-base polymer, and said hydrophobic-base polymer is polysulfone, polyethersulfone or derivatives thereof.

2. The self-wetting membrane of claim 1 wherein said polysulfone polymer has the structural formula:

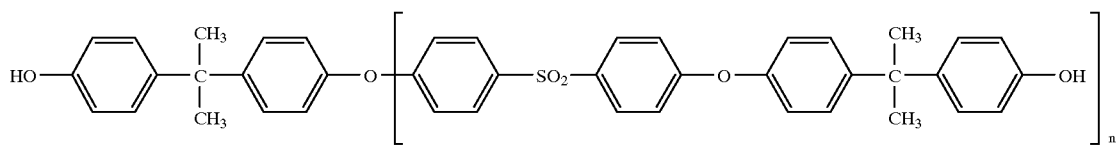

wherein n is an integer from about 30 to about 225.

3. The self-wetting membrane of claim 2 wherein n is an integer from about 45 to about 130.

4. The self-wetting membrane of claim 1 wherein said polyethersulfone polymer has the structural formula:

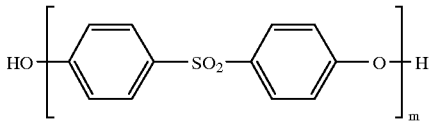

wherein m is an integer from about 50 to about 175.

5. The self-wetting membrane of claim 4 wherein m is an integer from about 60 to about 100.

6. The self-wetting membrane of claim 1 wherein said hydrophilic polymer is an aliphatic polyether polymer or a derivative thereof having one of the following formulas:

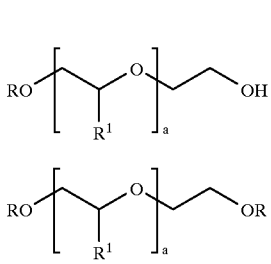

wherein R is hydrogen or lower alkyl, $R^1$ is hydrogen or lower alkyl; and a is an integer from about 10 to about 150.

7. The self-wetting membrane of claim 6 wherein R is hydrogen or lower alkyl, and a is from about 15 to about 150.

8. The self-wetting membrane of claim 7 wherein R is hydrogen or methyl; and a is from about 15 to about 150.

9. The self-wetting membrane of claim 8 wherein $R^1$ is hydrogen or methyl.

10. The self-wetting membrane of claim 6 wherein said aliphatic polyether polymer derivative is terminated with mesylate, tosylate, —NH$_2$, —CHO, halide, COOR$^2$ wherein $R^2$ is hydrogen or lower alkyl, —COX wherein X is halogen, epoxide or vinylic end groups.

11. The self-wetting membrane of claim 1 wherein segment "B" of said block copolymer is a polysulfone polymer, a polyethersulfone polymer or an oligomer thereof.

12. The self-wetting membrane of claim 11 wherein said polyethersulfone polymer has repeating units of the formula:

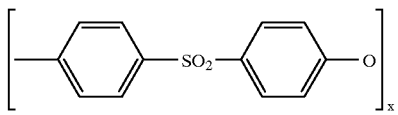

wherein x is an integer from about 12 to about 200.

13. The self-wetting membrane of claim 12 wherein x is an integer from about 12 to about 40.

14. The self-wetting membrane of claim 13 wherein said polyethersulfone polymer is terminated with —OH, —NH$_2$, Cl, F, Br, NCO or vinyl end groups.

15. The self-wetting membrane of claim 14 wherein said terminating end groups are —OH.

16. The self-wetting membrane of claim 11 wherein said polysulfone polymer has repeating units of the formula:

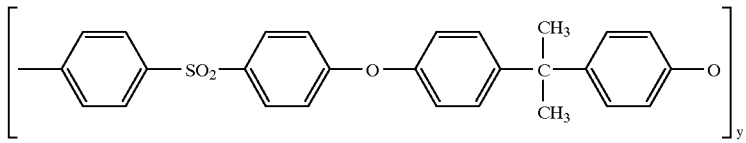

wherein y is an integer from about 6 to about 100.

17. The self-wetting membrane of claim 16 wherein y is an integer from about 10 to about 20.

18. The self-wetting membrane of claim 17 wherein said polysulfone polymer is terminated with —OH, —NH$_2$, Cl, F, Br, NCO or vinyl end groups.

19. The self-wetting membrane of claim 18 wherein said terminating end groups are —OH.

20. The self-wetting membrane of claim 1 wherein the additive is added in an amount, based on the total polymer mass, of from about 3 to about 20 wt. %.

21. The self-wetting membrane of claim 20 wherein the additive is added in an amount of from about 4 to about 15 wt. %.

22. The self-wetting membrane of claim 1 wherein the self-wetting membrane is a flat sheet membrane, a pleated membrane, a hollow fiber membrane or a tubular membrane.

23. The self-wetting membrane of claim 22 wherein the self-wetting membrane is a hollow fiber membrane.

24. A device useful in hemodialysis, microfiltration or ultrafiltration applications comprising a filter containing a self-wetting membrane, wherein said self-wetting membrane comprises a blend of a hydrophobic-base polymer and an additive, said additive being present in an amount of at least about 3 wt. % so as to achieve improved wettability of said hydrophobic-base polymer, said wt. % being based on total polymer mass of said membrane, wherein said additive is incorporated into said hydrophobic-base polymer and comprises a block copolymer having one of the following formulas:

AB or ABA wherein A is a hydrophilic polymer and B is a hydrophobic polymer that is analogous in structure to said hydrophobic-base polymer, and said hydrophobic-base polymer is polysulfone, polyethersulfone or derivatives thereof.

25. The device of claim 24 wherein said filter comprises a disposable cartridge which is in the form of a pleated cylinder, flat disc or hollow disc.

26. The device of claim 24 wherein said polysulfone polymer has the structural formula:

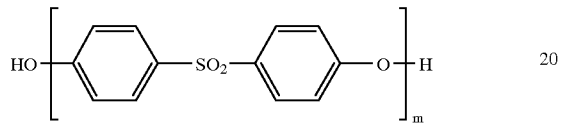

wherein n is an integer from about 30 to about 225.

27. The device of claim 26 wherein n is an integer from about 45 to about 130.

28. The device of claim 24 wherein the polyethersulfone polymer has the structural formula:

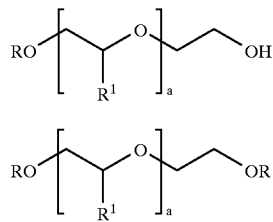

wherein m is an integer from about 50 to about 175.

29. The device of claim 28 wherein m is an integer from about 60 to about 100.

30. The device of claim 24 wherein said hydrophilic polymer is an aliphatic polyether polymer or a derivative thereof having one of the following formulas:

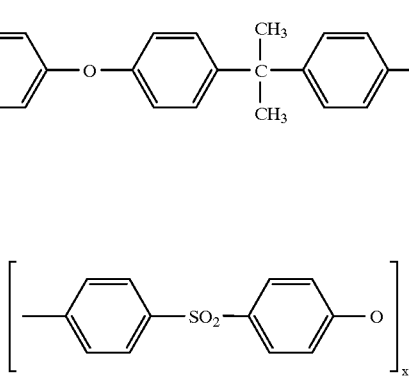

wherein R is hydrogen or lower alkyl, $R^1$ is hydrogen or lower alkyl; and a is an integer from about 10 to about 150.

31. The device of claim 30 wherein R is hydrogen or lower alkyl, and a is from about 15 to about 150.

32. The device of claim 30 wherein said aliphatic polyether polymer derivative is terminated with mesylate, tosylate, —$NH_2$, —CHO, halide, $COOR^2$ wherein $R^2$ is hydrogen or lower alkyl, —COX wherein X is halogen, epoxide or vinylic end groups.

33. The device of claim 31 wherein R is hydrogen or methyl; and a is from about 15 to about 150.

34. The device of claim 33 wherein $R^1$ is hydrogen or methyl.

35. The device of claim 24 wherein B of said block copolymer is a polysulfone polymer, a polyethersulfone polymer or an oligomer thereof.

36. The device of claim 35 wherein said polyethersulfone polymer has repeating units of the formula:

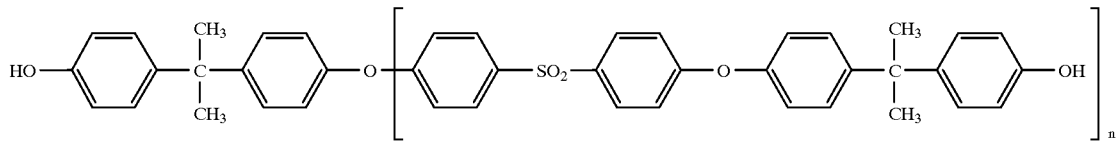

wherein x is an integer from about 12 to about 200.

37. The device of claim 36 wherein x is an integer from about 12 to about 40.

38. The device of claim 37 wherein said polyethersulfone polymer is terminated with —OH, —$NH_2$, Cl, F, Br, NCO or vinyl end groups.

39. The device of claim 38 wherein said terminating end groups are —OH.

40. The device of claim 35 wherein said polysulfone polymer has repeating units of the formula:

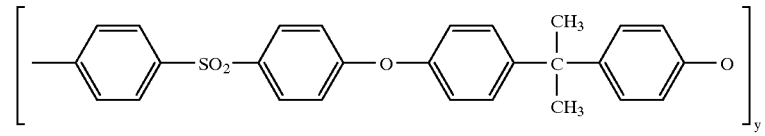

wherein y is an integer from about 6 to about 100.

41. The device of claim 40 wherein y is an integer from about 10 to about 20.

42. The device of claim 41 wherein said polysulfone polymer is terminated with —OH, —$NH_2$, Cl, F, Br, NCO or vinyl end groups.

43. The device of claim 42 wherein said terminating end groups are —OH.

44. The device of claim 24 wherein the self-wetting membrane is a flat sheet membrane, a pleated sheet membrane, a hollow fiber membrane or a tubular membrane.

45. The device of claim 44 wherein the self-wetting membrane is a hollow fiber membrane.

* * * * *

UNITED STATES PATENT AND TRADEMARK OFFICE
CERTIFICATE OF CORRECTION

PATENT NO. : 5,911,880
DATED : June 15, 1999
INVENTOR(S) : Elias Klein, et al.

It is certified that error appears in the above-identified patent and that said Letters Patent are hereby corrected as shown below:

Column 4 and Column 5, Formula: "OH]" should read --O]H--

Column 13, Formula, Table II:

"Functional     should read     --Functional
 Wettability"                    Wettability
                                    (%) --

Column 14, Line 40, Claim 1: "additive, said" should read --additive wherein said--

Column 13 and Column 14, Formula: "OH]" should read --O]H--

Column 17, Line 1, Claim 26: "Claim 24" should read --Claim 25--

Column 17 and Column 18, Formula: "OH]" should read --O]H--

Signed and Sealed this

Eighth Day of May, 2001

*Attest:*

NICHOLAS P. GODICI

*Attesting Officer*      *Acting Director of the United States Patent and Trademark Office*